J. M. Dorman.
Plow.
No. 89,565. Patented May 4, 1869.
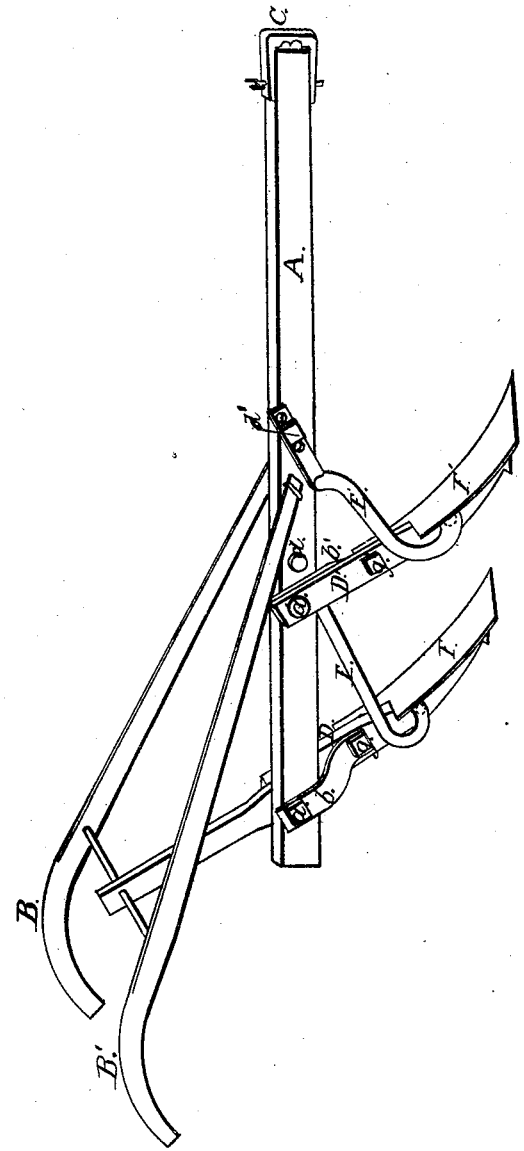
Witnesses:
H. W. Jenkins
Rufus R. Rhodes
Inventor:
J. M. Dorman

United States Patent Office.

JAMES M. DORMON, OF CLAIBORNE PARISH, LOUISIANA.

Letters Patent No. 89,565, dated May 4, 1869.

IMPROVEMENT IN PLOWS.

The Schedule referred to in these Letters Patent and making part of the same.

*To all whom it may concern:*

Be it known that I, JAMES M. DORMON, of the parish of Claiborne, and State of Louisiana, have invented a certain new, useful, and improved Cultivator; and I do hereby declare the following to be a full, clear, and exact description of the same, reference being had to the annexed drawing, making a part of this specification.

My invention consists of an arrangement of two plows, of peculiar form or construction, on one beam, in combination with articulating braces for adjusting the angles of the said plows, independently of each other, so that, at the pleasure of the plowman, the furrow made by each plow may be of equal or different depths.

But my invention will be better understood by referring to the drawing, which exhibits my invention in all its parts, the view being in perspective.

On the drawing—

A is the beam of the cultivator, and B B' the handles by which it is guided.

These handles may be of the form and attached to the cultivator as shown, or they may be of any other form, and attached in any other suitable manner.

The clevis C may also be of any proper form.

On opposite sides of the beam, at about the distance apart that is shown on the drawing, allowance being made for the reduced size thereon delineated, and occupying substantially the same relations to the beam as shown, the two plow-shanks D D' are pivoted, by means of strong bolts, $a$ $a'$, all lateral vibration being prevented by means of brace-straps $b$ $b'$, which, at each of their respective lower ends, are securely fastened, the one to shank D, and the other to shank D', and at their upper ends, respectively, articulate on the bolts $a$ $a'$, which, passing through a hole at the upper extremity of each, secures them to the opposite side of the beam to which the shank to which each is attached is adjusted, as clearly shown on the drawing.

At the lower extremities of the shanks D D' are secured the braces E E', in such manner that they can be articulated at the point of attachment, and thus be made to assume a different angle, whenever it is necessary or expedient to change the angle of the plows, in order to make them cut a deeper or shallower furrow, as occasion may require.

To change the angles of the plows, the braces E E' must be shortened or lengthened, and to provide for this, the said braces are perforated, at their front ends, with a series of holes, $c$, through which a bolt, $d$, passes, in the case of one, and a bolt, $d'$ through the other, and secures them to the beams at two different points, as shown.

By shifting the holes through which these bolts pass, the braces E E' are shortened or lengthened, as the case may be, and the angles of the plows, with respect alike to the beam and the ground, are increased or diminished, and consequently the depths of the furrows cut will be greater or less.

Secured to the two shanks D D', respectively, each by two strong bolts, $g$ $g'$, substantially as shown, are two plowshares, F F', the same being so constructed as to present an acute angle, and therefore a sharp edge along the whole extent of their longitudinally-concave fronts; that is to say, the inclination of the turning-faces of these shares, with respect to the landside or face, makes a very sharp edge relatively to any other plow of which I have any knowledge, and hence a sharper point than is usually found, is necessarily created.

The effect resulting from the sharp points and the thin wedge-like shape of the plows, is obviously to reduce the power required to carry them through the ground, to an enormous extent, as compared to existing turning-plows, with any given width and depth of furrow.

I propose to make my plowshares, in their widest transverse sections, from four to eight inches wide, accordingly as they are designed to be drawn by one or two animals.

When made four inches wide each, the cultivator will make a furrow eight inches wide, and yet I have found that one mule will easily carry the implement through the field all day without undue fatigue, whereas no single animal can work a single-bladed plow that will cut a furrow of that width, without quickly breaking down.

The braces E E' enable me, by a proper adjustment of either of the plows, to run a shallow furrow close to rows of growing crops, whatever may be the nature of the same, and therefore without injury to the roots of the same, whilst the other plow cuts deep into the ground, and prepares it for the easy penetration of the roots, as they extend in length after the plowing it over, or, in fine, to vary the depth of the two sections, if I may so call them, of the furrow that is cut by my cultivator every time it traverses the field, whenever, for any reason, it is expedient and proper to do so.

Having thus described my invention,

What I claim, and desire to secure by Letters Patent, is—

The peculiarly-formed plowshares F F', in combination with the articulating and adjusting-braces E E', when said plowshares and said braces are constructed and operate as herein described.

J. M. DORMON.

Witnesses:
H. N. JENKINS,
RUFUS R. RHODES.